May 12, 1964  T. M. LAAKSO ETAL  3,133,047
COPOLYMERS COMPRISING SALTS OF N-SULFOALKYL-α,β-UNSATURATED
DICARBOXYLIC IMIDES
Original Filed Jan. 29, 1960
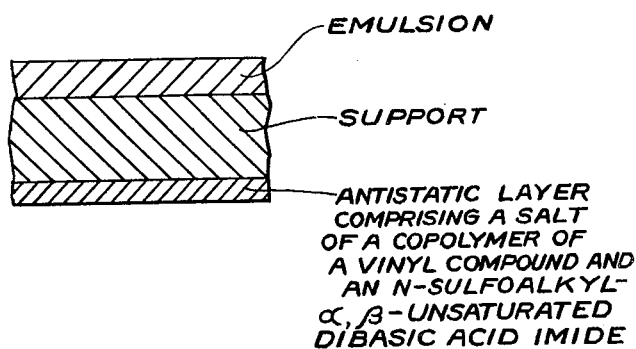
Thomas M. Laakso
Robert Fleisher
INVENTORS
BY R. Frank Smith
Leonard E. Brancken
ATTORNEYS 3,133,047
COPOLYMERS COMPRISING SALTS OF N-SULFOALKYL α,β-UNSATURATED DICARBOXYLIC IMIDES
Thomas M. Laakso and Robert Fleisher, Rochester, N.Y., assignors to Eastman Kodak Company, Rochester, N.Y., a corporation of New Jersey
Original application Jan. 29, 1960, Ser. No. 5,397, now Patent No. 3,039,870, dated June 19, 1962. Divided and this application Mar. 1, 1962, Ser. No. 176,644
5 Claims. (Cl. 260—78.5)

This invention relates to antistatic photographic elements comprising a film or paper support material having at least one layer thereon which contains an alkali metal or ammonium salt of a copolymer of a vinyl compound and an N-sulfoalkyl derivative of an α,β-ethylenically unsaturated dicarboxylic acid imide having antistatic properties.

This application is a division of our co-pending application Serial No. 5,397, now Patent No. 3,039,870, filed January 29, 1960.

It is known that styrene-maleic anhydride heteropolymer can be treated with alkylamines to form the corresponding N-alkyl substituted imides. However, such prior art compounds are insoluble in dilute alkaline solutions, and further, they are relatively poor conductors of static electricity so that they are unsuitable for antistatic purposes, especially in the photographic art where it is desirable to have an effective antistatic coating on the support material that can be readily removed by alkaline developer solutions. We have found that the alkali metal and ammonium salts of certain derived copolymers of vinyl compounds and N-sulfoalkyl derivatives of α,β-ethylenically unsaturated dicarboxylic acid imides are not only soluble in dilute aqueous alkaline solutions, but also have the valuable property of being relatively good electrical conductors and highly suited as antistatic coatings on photographic film and paper supports.

It is, accordingly, an object of the invention to provide a new class of polymeric compounds and alkali metal and ammonium salts thereof. Another object is to provide sheet materials that are antistatic in character and more particularly photographic films and papers that are resistant to the build up of static electricity. Another object is to provide a process for preparing such polymeric compounds and salts and sheet materials. Other objects will become apparent hereinafter.

In accordance with the invention, we prepare our polymeric salts by reacting (1) the heteropolymer of a vinyl compound having the general formula:

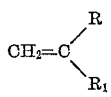

and an α,β-unsaturated dicarboxylic anhydride having the general formula:

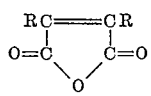

wherein in each instance R stands for hydrogen, methyl group or a halogen such as chlorine or bromine and $R_1$ stands for hydrogen, phenyl, a halogen such as chlorine or bromine, —$OR_2$—, —$COR_2$, —$CONH_2$, —$CONHR_2$, —$CONR_2R_2$, —$COOR_2$, —$OCOR_2$, etc., wherein $R_2$ stands for an alkyl group of from 1–4 carbon atoms, with (2) an aminoalkanesulfonic acid containing from 2–4 carbon atoms such as, for example, β-aminomethane sulfonic acid, 1-aminopropane sulfonic acid, 2-aminopropane sulfonic acid, 3-aminopropane sulfonic acid, 1-aminobutane sulfonic acid, etc. until substantial conversion to the corresponding imide occurs. Advantageously, the reaction is carried out in a liquid basic type of solvent, e.g., pyridine, aniline, etc. at a temperature of about from 50–100° C. or even higher if desired. The imide product is then isolated by precipitating the reaction mixture into a nonsolvent such as diethyl ether, followed by redissolving the precipitate in water and converting it to the salt form by the addition of an aqueous alkaline solution such as sodium, potassium or lithium hydroxides or carbonates thereof or ammonium hydroxide to a pH of approximately 8.0 or higher. The polymeric salt is then recovered by precipitation into a relatively larger volume of acetone and washed with fresh acetone and dried. The polymeric salt products obtained by the above described procedure are soluble in water and are preferably employed in the form of their aqueous solutions for coating antistatic layers thereof on films and paper supports using conventional coating techniques. Water-methanol mixed solvents are especially efficacious in producing continuous, smooth coatings which are free of defects, which resist abrasion and which adhere firmly to the support material.

The polymeric salt products of the invention consist essentially of a copolymer of (1) a vinyl compound of the general structure:

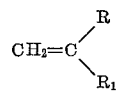

(2) an N-sulfoalkyl imide of an α,β-unsaturated dicarboxylic acid of the general structure:

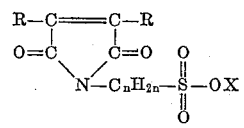

and (3) a maleic acid derivative of the general structure:

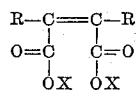

wherein R and $R_1$ are as previously defined and wherein $n$ stands for a whole number of from 2–4 and X stands for an alkali metal atom and the ammonium group —$NH_4$. The proportions of above (1), (2) and (3) in the polymer molecule consist essentially of approximately 50 mole percent of the compound of (1), from 10–50 mole percent of the compound of (2) and 40–0 mole percent of the compound of (3). Where the imidization reaction is complete as by prolonged heating of the reaction mixture substantially no residual anhydride units remain in the final product. Where the imidization reaction is incomplete, some residual anhydride units that remain are converted in the step of alkaline solution treatment to the corresponding dicarboxylic acid salts. However, amounts as little as 10 mole percent of the N-sulfoalkyl imide salt units in the final polymeric salt polymer molecule confer antistatic properties thereto. The polymeric salts prepared with the heteropolymer of styrene-maleic anhydride and taurine are preferred.

The intermediate heteropolymers can be prepared by conventional polymerization techniques, for example, by heating a mixture of approximately equimolar quantities of an appropriate vinyl compound with the α,β-monoethylenically unsaturated dicarboxylic anhydride, in the presence of a polymerization catalyst such as benzoyl peroxide, acetyl peroxide, sodium, potassium or ammonium persulfate, etc., the polymeric products being then separated from the reaction mixture by conventional means such as precipitation into a nonsolvent and filtering, washing, and drying the precipitate. If desired, the reaction can be carried out in emulsion form in a nonsolvent employing a redox type of catalyst system and an emulsifying agent such as the salt of higher fatty acid, e.g. sodium or potassium stearate, palmitate, etc. or a fatty alcohol sulfate, e.g. sodium or potassium lauryl sulfate, etc. or the reaction can be carried out in a solvent such as acetone from which the heteropolymer can be separated by pouring the reaction mixture into cold water. Where a redox system is employed, an accelerator such as an alkali metal bisulfite, e.g. sodium bisulfite can also be used with advantage. Suitable intermediate heteropolymers include styrene-maleic anhydride heteropolymer, ethylene-maleic anhydride heteropolymer, acrylonitrile-maleic anhydride heteropolymer, methacrylonitrile-maleic anhydride heteropolymer, vinyl chloride-maleic anhydride heteropolymer, vinylidene chloride-maleic anhydride heteropolymer, acrylamide, methacrylamide, N-alkyl and N,N-dialkyl acrylamide and methacrylamide heteropolymers with maleic anhydride, vinyl alkyl ether heteropolymers with maleic anhydride, vinyl alkyl ketone heteropolymers with maleic anhydride, wherein in each instance above the said alkyl group contains from 1–4 carbon atoms, vinyl carboxylic acid esters such as vinyl acetate, vinyl propionate or vinyl butyrate heteropolymers with maleic anhydride, the corresponding isopropenyl carboxylic acid esters with maleic anhydride, acrylic and methacrylic acid esters such as methyl acrylate, butyl acrylate, methyl methacrylate, etc., heteropolymers with maleic anhydride, and corresponding heteropolymers with other $\alpha,\beta$-unsaturated dicarboxylic acid anhydrides such as chloromaleic anhydride, dichloromaleic anhydride, bromomaleic anhydride, dibromomaleic anhydride, citraconic anhydride and dimethylmaleic anhydride.

The accompanying drawing is a sectional view of a photographic element wherein a support material 1 composed of a cellulose derivative, e.g. cellulose acetate, cellulose propionate, cellulose acetate-butyrate, cellulose nitrate, etc., a polyamide of a dibasic carboxylic acid and a diamine, e.g. nylon, a polyester of a dibasic acid and a glycol, e.g. polyethylene terephthalate, etc., polystyrene, paper and more particularly baryta coated paper and the like, has coated thereon a polymeric salt of the invention and on the opposite side a layer 3 of a light-sensitive material, e.g. a gelatin-silver halide emulsion layer. Although the preferred method of employing the polymeric salts of the invention is in the form of a backing layer as shown in the drawing, the polymeric salts can also be incorporated in the sensitive emulsion layer or used as an overcoating layer over the sensitive emulsion layer to give antistatic properties to the photographic element. However, as indicated in the drawing, application of the polymeric salts to the back of support material, i.e. to the side opposite that of the sensitive emulsion layer or layers, is preferred.

The following examples will serve to illustrate further the preparation of the polymeric salts of the invention and the application of the same to the production of light-sensitive films and paper having excellent antistatic properties.

EXAMPLE 1

*Preparation of Styrene-Maleic Anhydride Copolymer*

In 7500 g. of acetone, 750 g. of styrene and 750 g. of maleic anhydride, together with 15 g. benzoyl peroxide, were refluxed at 65° C. with slow stirring in a constant temperature water bath for 24 hours. The resulting viscous dope was slowly poured into 50 gals. of cold tap water to precipitate the white fibrous copolymer. This copolymer was then washed with four changes of distilled water and dried at reduced pressure at 50° C. The yield of styrene-maleic anhydride copolymer having an intrinsic viscosity of 0.63 in acetone was 1.87 kgs.

EXAMPLE 2

*Sodium Salt of Styrene-N-Sulfoethylmaleimide Copolymer*

Ten and one-tenth grams of thoroughly dried styrene-maleic anhydride copolymer dissolved in 100 ml. dry pyridine and 6.25 g. taurine were heated at 58° C. in a constant temperature bath for 7 days with occasional shaking. The resulting mixture was leached in fresh ether. After removal of all the pyridine in this manner, the polymer was dissolved in 100 ml. of distilled water. The resulting solution was made alkaline to a pH of 8 with 50% sodium hydroxide solution. The sodium salt of the polymer was then isolated by precipitating into acetone and leaching in fresh acetone.

The yield of light buff colored product was 13.7 g. or 90% of the theoretical value.

Analysis

|   | Calculated for $C_{14}H_{14}O\ NSNa$, percent by weight | Found, percent by weight |
|---|---|---|
| C | 38.7 | 37.7 |
| H | 4.0 | 4.8 |
| N | 4.6 | 3.3 |
| S | 12.8 | 6.9 |

The analysis indicates that the product obtained was a copolymer consisting essentially of approximately 50 mole percent of polymerized styrene, 30 mole percent of the sodium salt of polymerized N-sulfoethylmaleimide and 20 mole percent of the sodium salt of polymerized maleic acid (by hydrolysis of the unreacted maleic anhydride). It was soluble in water and water-methanol mixtures.

EXAMPLE 3

*Sodium Salt of Ethylene-N-Sulfoethylmaleimide Copolymer*

A mixture of 62.5 g. (0.5 mole) of ethylene-maleic anhydride copolymer, 62.5 g. (0.5 mole) of taurine and 750 ml. of pyridine was heated and stirred under anhydrous conditions for 16 hours on a steam bath. The reaction mixture was then diluted with an equal volume of distilled water and made alkaline with 50% aqueous solution of sodium hydroxide. The viscous dope was precipitated into 8 volumes of acetone. A taffy-like polymer obtained was redissolved in a minimum amount of distilled water and reprecipitated again into 8 volumes of acetone. The friable, buff-colored polymer was dried at room temperature under reduced pressure. The yield was 96.7% based on the weight of initial heteropolymer. Analysis indicated that the polymeric salt product consisted essentially of approximately 50 mole percent of polymerized ethylene, 15 mole percent of the sodium salt of polymerized N-sulfoethylmaleimide and 35 mole percent of the sodium salt of maleic acid.

EXAMPLE 4

This example illustrates the antistatic properties of photographic films coated with the polymeric salts of the invention.

In each instance, the polymeric salt was dissolved in a water miscible solvent mixture, for example, a mixture consisting of about 35% by weight of water and about 65% by weight of methanol and, if desired, containing also about 0.1% by weight of a wetting agent such as a fatty alcohol sulfate, saponin, etc., in a concentration of about 0.5–1.5% of the polymeric salt based on the total weight of the solution and the solution was then applied as a backing layer to a sheet of cellulose acetate film base by means of a dip roller and dried. This coating ranged in thickness from about 1.5–3.0 micrograms/cm.$^2$. The film was then further coated on the reverse side with a suitable subbing layer and a gelatino-silver halide emulsion coated thereover. The following table lists the polymeric salt, the thickness of the coatings and conductivities of the coated films.

TABLE

| Polymeric Salt | Thickness, μg./cm.² | Conductivity, ×10⁻¹⁰ mho |
|---|---|---|
| Product of Ex. 2 | 1.82 | 4 |
|  | 1.95 | 4 |
|  | 2.10 | 6 |
|  | 2.25 | 4 |
|  | 2.40 | 3 |
|  | 2.55 | 4 |
| Product of Ex. 3 | 2.0 | 3.3 |

By the addition of alkali metal salts to the above coating solutions, the conductivities can be further increased. For example, in a test containing 0.025% by weight of lithium chloride, based on the total weight of the solution, with a coating thickness of 2.25, the measured conductivity was approximately $10 \times 10^{-10}$ mho for the product of Example 2. A particularly advantageous feature of the antistatic coatings of the invention is that no scum formation occurs even with exhausted developer solutions. Similar conductivity tests were also made by coating the above solutions onto paper having a gelatino-silver halide emulsion layer thereon. The results obtained with the paper elements were of the same general order as those set forth for the film elements in the above table.

Since conductivities of the order greater than $10^{-10}$ mho have been found to alleviate difficulties from static electricity generated in the normal handling of photographic film, it will be seen from the above table that by use of the polymeric salts of the invention in appropriate concentrations and solvent combinations as coatings, films can be prepared which are free from troublesome static effects.

The values for conductivity were determined by placing two parallel electrodes on the film at a fixed relative humidity of 50%; these electrodes are long compared to the distance between them, so as to avoid end effects. The observed reading is divided by the distance between electrodes and multiplied by their length, to obtain the surface resistivity in ohms, the conductivity being the reciprocal thereof.

While the polymeric salts of the invention have been illustrated primarily in connection with their use as antistatic coatings for light-sensitive photographic films, it will be understood that coatings thereof are also efficacious in the prevention of static build up and adhesion when coated on non-sensitized surfaces such as various natural and synthetic wrapping materials. They also have utility for textile anti-static treatment and as dispersing or wetting agents. Also, various fillers, dyes, softeners, gelatin, etc. can be incorporated, if desired, into the coating compositions of the invention.

What we claim is:

1. A resinous linear copolymer consisting essentially of (1) approximately 50 mole percent of a vinyl compound of the general structure:

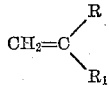

(2) from 10 to 50 mole percent of an imide of the general structure:

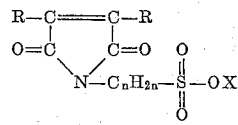

and (3) from 40 to 0 mole percent of a dibasic acid of the general structure:

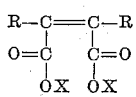

wherein $n$ represents a whole number of from 2 to 4, R represents a member selected from the group consisting of a hydrogen atom, a methyl group, a chlorine atom and a bromine atom, $R_1$ represents a member selected from the group consisting of a hydrogen atom, a phenyl group, a chlorine atom, a bromine atom, $-OR_2$, $-COR_2$, $-CONH_2$, $-CONHR_2$, $-CONR_2R_2$, $-COOR_2$ and $-OCOR_2$, wherein $R_2$ represents an alkyl group of from 1 to 4 carbon atoms, and X represents a member selected from the group consisting of an alkali metal atom and ammonium group.

2. A resinous linear copolymer consisting essentially of (1) approximately 50 mole percent of styrene, (2) from 10 to 50 mole percent of N-sulfoethylmaleimide sodium salt and (3) from 40 to 0 mole percent of maleic acid sodium salt.

3. A resinous linear copolymer consisting essentially of (1) approximately 50 mole percent of ethylene, (2) from 10 to 50 mole percent of N-sulfoethylmaleimide sodium salt and (3) from 40 to 10 mole percent of maleic acid sodium salt.

4. A resinous linear copolymer consisting essentially of (1) approximately 50 mole percent of styrene, (2) 30 mole percent of N-sulfoethylmaleimide sodium salt and (3) 20 mole percent of maleic acid sodium salt.

5. A resinous linear copolymer consisting essentially of (1) approximately 50 mole percent of ethylene, (2) 15 mole percent of N-sulfoethylmaleimide sodium salt and (3) 35 mole percent of maleic acid sodium salt.

References Cited in the file of this patent

UNITED STATES PATENTS

| 2,914,510 | Contois | Nov. 24, 1959 |
| 2,984,639 | Stamberger et al. | May 16, 1961 |

UNITED STATES PATENT OFFICE
CERTIFICATE OF CORRECTION

Patent No. 3,133,047                                              May 12, 1964

Thomas M. Laakso et al.

It is hereby certified that error appears in the above numbered patent requiring correction and that the said Letters Patent should read as corrected below.

column 5, line 20, for "$10 \times 10^{-10}$" read -- $20 \times 10^{-10}$ --.

Signed and sealed this 17th day of November 1964.

(SEAL)
Attest:

ERNEST W. SWIDER
Attesting Officer

EDWARD J. BRENNER
Commissioner of Patents